March 19, 1968 R. F. STEWART 3,374,450
WAVEGUIDE FLANGE AND COUPLING ASSEMBLY
Filed Nov. 17, 1965
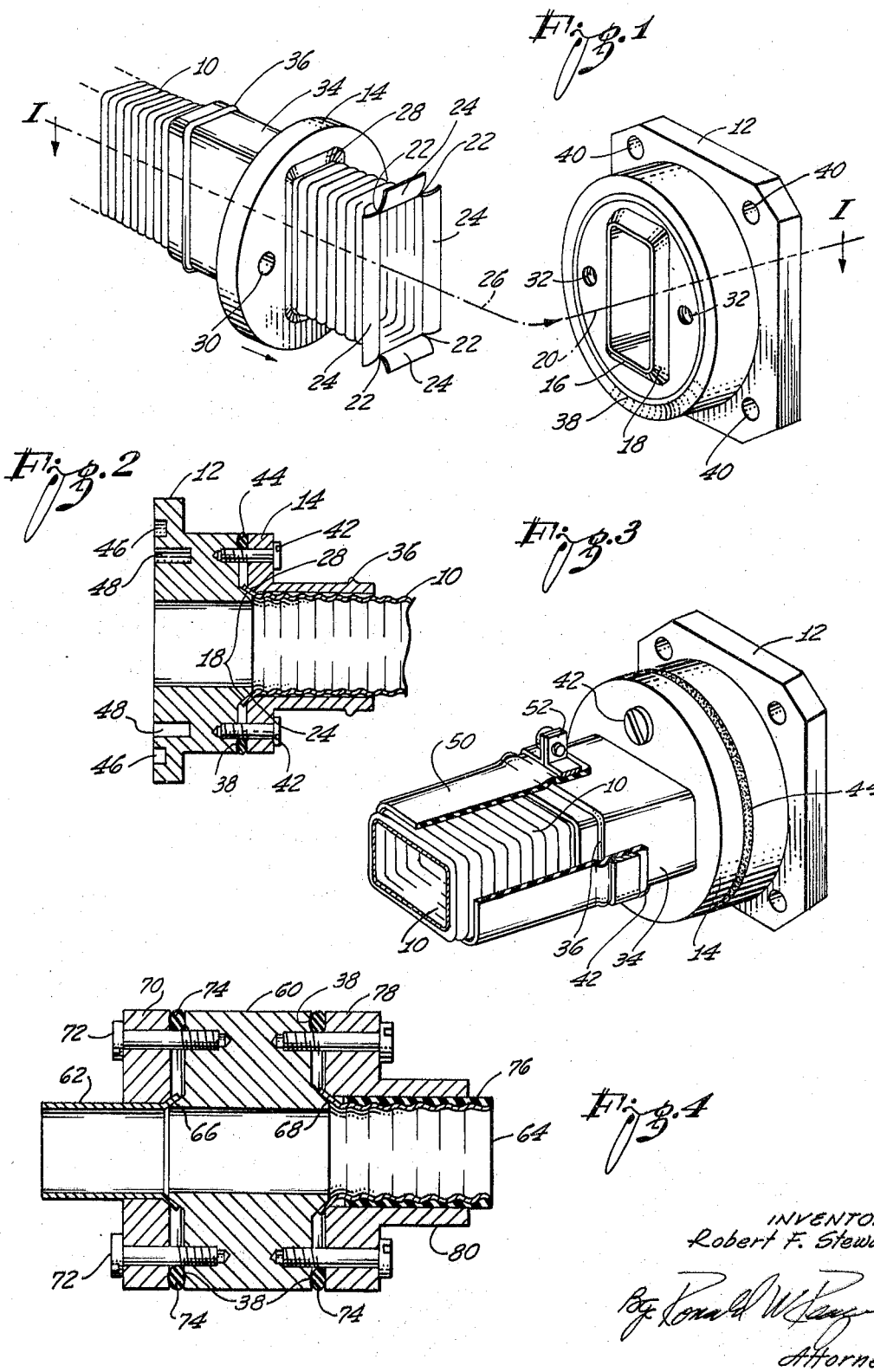
INVENTOR:
Robert F. Stewart
Attorney

United States Patent Office 3,374,450
Patented Mar. 19, 1968

3,374,450
WAVEGUIDE FLANGE AND
COUPLING ASSEMBLY
Robert F. Stewart, Convent Station, N.J., assignor to
Litton Precision Products, Inc., Morris Plains, N.J., a
corporation of Delaware
Filed Nov. 17, 1965, Ser. No. 509,682
8 Claims. (Cl. 333—98)

This invention relates to electromagnetic waveguides and more particularly to an improved flange and coupling assembly for such waveguides and an improved method for attaching the flange assembly to the waveguide.

Rectangular waveguides are used to transmit high frequency electromagnetic wave energy between desired points such as a transmitter and an antenna or an antenna and a receiver. The use of such rectangular waveguides is well known in the microwave art and the desired characteristics for such waveguides include mechanical strength; low attenuation; low voltage standing wave ratio, or VSWR; and high power carrying capability. The waveguide used in such applications may be either rigid wall waveguide or flexible waveguide. Different types of flexible rectangular waveguide known in the art include soldered convolute waveguide; unsoldered convolute, or twistable waveguide; and side seam waveguide. Such rectangular waveguide, whether rigid or flexible, is usually made in standard lengths or shapes with flanges at each end to attach to other pieces of waveguide in order that the pieces of waveguide may be assembled into any desired shape to transmit the electromagnetic wave energy between the desired points.

The obvious advantage of flexible waveguide over rigid wall waveguide is its mechanically flexible property whereby a section of it may be used to join two pieces of rigid waveguide whose axes are not aligned or it may be used to "snake" through a region where a straight line path is either not available or for some reason not desired. Thus the use of flexible waveguide gives a designer greater freedom of choice in laying out waveguide paths.

As is well known to those skilled in the waveguide art, one of the primary locations of operational trouble in the waveguide is at the flange of a piece of waveguide assembly. Trouble may occur either between the waveguide and its flange or between the two flanges of adjacent pieces of waveguide. Because of the discontinuity caused by the flange, possible problems which may be encountered include reflected power, high VSWR, power leakage and arcing.

The traditional manner of attaching a flange member to a piece of waveguide, especially flexible waveguide, is to solder the waveguide to the flange assembly. This soldering operation creates a number of problems in a flexible waveguide manufacturing operation and is one of the most expensive steps in the process of manufacturing flexible waveguide. First, soldering requires a relatively high temperature. Because flexible waveguide is inherently more delicate than rigid wall waveguide, these higher temperatures required for soldering sometimes cause buckling or dimensional changes in the waveguide wall which, though relatively slight, are sufficient to cause RF mismatch, reflection of RF power and high VSWR. Also, it is frequently necessary to provide a jacket of material such as vinyl, neoprene, butyl or silicone on flexible waveguide to provide mechanical and chemical protection to the flexible waveguide and to seal the waveguide for those applications which require pressurized waveguide assemblies. In these cases, the jacket must be applied to the flexible waveguide after the flange is soldered to the waveguide, since the soldering temperatures would destroy the jacket material. Since the cross section of the flange is usually much greater than the cross section of the waveguide, the jacket cannot be slipped over the end of the waveguide. It must instead be molded onto the outer surface of the waveguide after the flange has been soldered to the end of the waveguide.

It is thus seen that soldering flexible waveguide to a flange member is both a troublesome and expensive operation in the manufacturing procedure and also sometimes causes flaws in the resultant structure which renders the structure unsuitable for its designed purpose.

It is accordingly an object of the present invention to provide an improved waveguide assembly.

It is another object of the present invention to provide an improved flange assembly for a waveguide which can be attached to the waveguide without soldering.

It is yet another object of the present invention to provide an improved method of attaching a flange to a section of waveguide which requires no soldering.

It is yet another object of the present invention to provide an improved waveguide assembly and method of attaching a flange to a waveguide which can be fabricated to desired lengths at an installation site.

It is still another object of the present invention to provide an improved waveguide flange assembly and method of attaching the flange to the waveguide in which the jacket material may be easily placed around the waveguide prior to attaching the flange to the waveguide.

It is still another object of the present invention to provide an improved assembly for coupling two sections of waveguide in which the conventional flange interface is eliminated.

Briefly stated and in accordance with one embodiment of the present invention, a waveguide flange assembly is provided which includes a section of rectangular waveguide, a flange member for attaching the waveguide to another section of waveguide and a collar member for securing the waveguide to the flange member. The flange member includes a first substantially rectangular opening having predetermined dimensions relative to the internal dimensions of the waveguide and also includes a shoulder member surrounding the rectangular opening. The shoulder member includes a male clamping surface which makes an acute angle with the axis of the rectangular opening in the flange member. The side walls of the rectangular waveguide are flared at the end to be attached to the flange to the same acute angle with respect to the axis of the rectangular waveguide. The collar member includes a second substantially rectangular opening having dimensions slightly greater than the external dimensions of the waveguide such that the collar member may be readily slipped over the waveguide. The collar member also includes a female clamping surface surrounding its rectangular opening which makes the same acute angle with respect to the axis of its rectangular opening. The flange member, rectangular waveguide and collar member are assembled such that their axes are aligned, with the collar member positioned around the rectangular waveguide and the flared side walls of the rectangular waveguide positioned between the male and female clamping surfaces. The collar and flange member are then secured together, such as with screws, whereby the flared side walls of the rectangular waveguide are clamped between the male and female clamping surfaces and the flange member is secured to th rectangular waveguide.

For a better understanding of the invention, together with other objects and advantages thereof, reference may be had to the accompanying drawings in which:

FIGURE 1 shows an exploded view in a waveguide flange assembly in accordance with the present invention;

FIGURE 2 shows a cross sectional view of the waveguide flange assembly of FIGURE 1;

FIGURE 3 shows a perspective view, partially broken away, of the rear of the waveguide flange assembly of FIGURES 1 and 2 and shows how the jacket is attached to the assembly; and FIGURE 4 shows a cross sectional view of a waveguide coupling assembly utilizing a second embodiment of the present invention.

Referring now to the drawings, FIGURE 1 shows an exploded view of a waveguide flange assembly in accordance with the present invention. As shown therein, the assembly includes a section of flexible waveguide 10, a flange member 12 and a collar member 14. It is desired to secure the end of waveguide section 10 to one side of flange member 12 in order that the entire assembly may be attached to another waveguide section or microwave component (not shown) having a flange similar to flange member 12.

Flange member 12 includes a substantially rectangular opening whose dimensions are determined by the dimensions of waveguide 10. Usually the dimensions of this rectangular opening will be the same as the internal dimensions of the waveguide but it is sometimes desired to have different dimensions in order that the flange also acts as a transformer section. A shoulder or protrusion 16 surrounds the rectangular opening on the surface of flange member 12 which receives waveguide 10. Shoulder 16 includes a male clamping surface 18 which, if extended makes a predetermined acute angle with the axis 20 of the rectangular opening.

The end of waveguide 10 which is to be attached to flange member 12 is cut at each corner 22 and the side walls 24 are bent or folded outwardly until they form substantially the same angle with the axis 26 of waveguide 10 that the male clamping surface 18 forms with axis 20.

Collar member 14, shown already slid onto waveguide 10, includes a central substantially rectangular opening whose dimensions are slightly larger than the external dimensions of waveguide 10 to allow collar member 14 to slide onto waveguide 10. Collar member 14 also includes a female clamping surface 28 surrounding the rectangular opening which makes substantially the same predetermined acute angle with the axis of its rectangular opening and which mates with the male clamping surface 18 of flange member 12.

Assembly is made by sliding collar member 14 onto waveguide 10 and then cutting the corners 22 of waveguide 10 and folding the side walls 24 back to approximately the correct angle. This point in the assembly operation is shown in FIGURE 1. Collar member 14 is then slid forward until female clamping surface 28 loosely engages the external sides of flared side walls 24. Flange member 12 is then placed against the end of waveguide 10 such that the male clamping surface 18 engages the internal sides of side walls 24. Collar member 14 and flange member 12 are then secured together, such as by screws or bolts (not shown in FIGURE 1) extending through holes 30 in collar member 14 and threaded into tapped holes 32 in flange member 12. As the screws or bolts are tightened, the side walls 24 are securely gripped by the male clamping surface 18 and female clamping surface 28 and waveguide 10 is securely mechanically fastened to flange member 12 without any soldering or application of heat.

It will be appreciated by those skilled in the art that the assembly is self-aligning and that the shoulder member 16 inherently brings waveguide 10 into precision alignment with the rectangular opening in flange member 12 so that there is no RF mismatch or reflections and that the resultant structure has a quite low VSWR.

Also shown in FIGURE 1, but not discussed there, are a shoulder 34 on the back side of collar member 14, a bead 36 on shoulder 34, a groove 38 on the surface of flange member 12 for receiving a rubber O-ring and holes 40 on flange member 12. These features will be discussed in connection with FIGURES 2 and 3.

Referring now to FIGURE 2, therein is shown a cross sectional view taken along the lines I—I of FIGURE 1 after the assembly operation is completed. As shown therein, the flared side walls 24 at the end of waveguide 10 are held between male clamping surface 18 and female clamping surface 28 of flange member 12 and collar member 14 respectively. These members are in turn securely held together by screws 42. An O-ring 44 made from rubber or the like is positioned between flange member 12 and collar member 14 to provide a pressure tight assembly in order that the waveguide system in which the assembly is to be employed may be pressurized if desired. A small O-ring (not shown) may also be used around the head of screws 42 if desired.

As is shown in FIGURE 2, the surface of flange member 12 which mates with another flange member when the assembly is attached to another piece of waveguide (not shown) is provided with grooves 46 and 48 which serve the well known function of quarter and half wave length choke members to prevent radiation of power from the joint between the adjacent flanges. Such choke grooves are well known to those skilled in the art but, as will later be described in detail, they can be much more easily and cheaply machined into flange member 12 when the present invention is utilized as compared to when the prior art soldered flanges are utilized.

FIGURE 3 shows a perspective view, partially broken away, of an assembled waveguide flange structure in accordance with the present invention which also includes a flexible jacket 50 formed from a suitable material such as rubber, neoprene, silicone, vinyl, butyl or the like and illustrates how, in accordance with the present invention, such jackets may be much more easily and cheaply assembled onto a flexible waveguide structure. As was earlier mentioned, such jackets are frequently used on flexible waveguide both to protect the relatively fragile waveguide and also to provide a pressure tight seal in case the waveguide assembly is to be pressurized.

As is shown in FIGURE 3, the jacket 50, shown partially broken away, is economically formed into tubing or a hoselike member having internal dimensions slightly greater than the external dimensions of waveguide 10 and having whatever external dimensions are desired for a particular application. In assembly, the jacket 50 is first slid over waveguide 10 and collar member 14 is then slid over the end of waveguide 10, with shoulder section 34 being forced between the outer surface of waveguide 10 and the inner surface of jacket 50. A small bead member 36 is provided near the end of shoulder 34 and a suitable clamp such as band 52 is provided between bead 36 and the end of jacket 50. The side walls of waveguide 10 are then flared at the ends and flange member 12 is attached and secured by screws 42 as earlier described. Band clamp 52 is then tightened to secure jacket 50 to the shoulder 34 of collar member 14.

Those skilled in the art will readily appreciate the simplicity and cost savings which can be achieved through the use of the present invention. A section of flexible waveguide can be prepared by simply cutting a piece of waveguide to the desired length; attaching a flange assembly to one end thereof, as described above; cutting a piece of jacket material to the desired length and sliding it over the other end of the waveguide and attaching it to the already attached flange assembly and then attaching a second flange assembly to the other end of the waveguide as described in connection with FIGURE 3 above. The assembly can be performed within a factory or in the field at an installation site.

This is contrasted with the necessary complex assembly procedures for soldered flange flexible waveguide which must of necessity be performed in a factory. In this prior art flange assembly, it is necessary to first solder the flange to the end of the waveguide, as described earlier, then insert a mandrel into the waveguide to allow the jacket material to be molded onto the external surface of the waveguide. These operations obviously require temperature and pressure to be applied to the waveguide assembly and thus the more precise machining such as providing the choke grooves 46 and 48 and tapping holes 40 cannot be performed until after the temperature and pressure operations are complete. This contrasts with the present invention in which all machining can be more easily and economically performed on the individual component before final assembly. Experience has shown that an over-all cost saving of about thirty percent can be achieved through the use of the present invention.

Referring now to FIGURE 4, therein is shown a cross-sectional view similar to that of FIGURE 2 but which illustrates a second embodiment of the present invention. Also FIGURE 4 shows the invention used with two different types of waveguide than was illustrated in the earlier figures.

In FIGURE 4, a coupling member 60 is used to join a piece of rigid waveguide 62 to a piece of flexible waveguide 64. Coupling member 60 includes a central rectangular opening whose dimensions may be the same as the internal dimensions of waveguides 62 and 64 or it may have slightly different dimensions if it is desired to have coupling member 60 also serve as a transformer section. Shoulder member 66 surrounds the rectangular opening on one surface of coupling member 60 and shoulder member 68 surrounds the rectangular opening on the opposed surface of coupling member 60. Again, as was previously described, each shoulder member includes a male clamping surface which forms a predetermined acute angle with the axis of the rectangular opening.

Rigid waveguide 62 is flared at the end to be joined to coupling member 60 and a collar member 70 is provided which includes a rectangular opening having dimensions slightly greater than the external dimensions of rigid waveguide 62. A female clamping surface is formed in collar member 70 surrounding its rectangular opening which makes the same acute angle with respect to the axis of its rectangular opening. The flared ends of rigid waveguide 62 are positioned between the male clamping surface of coupling member 60 and the female clamping surface of collar 70 and the entire assembly is held together, as by screws 72. Again, a rubber O-ring 74 may be provided to effect a pressure tight seal between the members.

The end of rigid waveguide 62 may be flared in any desired manner. For example, the flare can be made by forcing an arbor having surfaces which make the desired predetermined acute angle with its axis into the end of rigid waveguide 62 until a flange of suitable length is formed.

Flexible waveguide 64 is attached to the opposed surface of coupling member 60 in a manner similar to that described in connection with FIGURES 1 and 2 previously. However, flexible waveguide 64 differs from the flexible waveguide 10 of the previous figures in that the flexible jacket material 76 is formed directly onto the outer surface of the waveguide during the manufacturing operation rather than being placed over the waveguide after manufacture and assembly, as previously described. For example, the jacket material may be extruded directly onto the flexible waveguide during the manufacturing operation.

Again, in FIGURE 4, the ends of flexible waveguide 64 are cut and flared as previously described and are clamped between the male clamping surface of coupling member 60 and a corresponding female clamping surface on collar 78. Now, however, jacket material 76 is positioned inside of shoulder member 80 rather than being outside of shoulder member 34 as shown in FIGURE 3.

Coupling member 60 thus serves to replace two of the flange members 12 of the embodiment of the invention described in FIGURES 1 through 3. Those skilled in the art will readily appreciate that the use of this embodiment of the present invention allows coupling between two rectangular waveguides, whether rigid or flexible, either in a factory or under field conditions at an installation site, which practically eliminates altogether the possibility of any power leakage between the interfaces of the waveguide. This assembly also allows cheaper manufacturing in that it eliminates the necessity for the accurately machined choke grooves 46 and 48 of FIGURE 2. Thus manufacturing costs are made lower and assembly even easier than the first described embodiment of the invention.

It is to be understood that the above described arrangements are illustrative of the application of the present invention. Numerous other applications and modifications may be devised by those skilled in the art without departing from the spirit and scope of the invention. Accordingly, it is understood that the present invention is limited only by the spirit and scope of the appended claims.

What is claimed is:

1. A waveguide assembly comprising, in combination, a section of rectangular waveguide; a flange member; and a collar member for securing said waveguide to said flange member, said flange member including a first substantially rectangular opening having predetermined dimensions relative to the internal dimensions of said waveguide and also including a shoulder member surrounding said first rectangular opening, said shoulder member having a male clamping surface which makes a predetermined acute angle with the axis of said first rectangular opening; said rectangular waveguide having its corners cut a predetermined distance at one end thereof and having its side walls folded back at said cut to said predetermined acute angle with respect to the axis of said rectangular waveguide; said collar member including a second substantially rectangular opening having predetermined dimensions relative to the external dimensions of said waveguide and also including a female clamping surface being at said predetermined acute angle with respect to the axis of said second rectangular opening; said flange member, rectangular waveguide and collar member being assembled such that their axes are aligned, said collar member is positioned around said rectangular waveguide and the folded portion of said side walls of said rectangular waveguide are positioned between said male and female clamping surfaces; and means securing said collar member to said flange member whereby the folded portion of said walls are clamped between said male and female clamping surfaces.

2. The waveguide assembly of claim 1 in which said section of rectangular waveguide comprises a section of flexible waveguide.

3. The waveguide assembly of claim 2 which further includes a jacket comprising a tubular section of flexible material, said jacket being positioned on said assembly around said flexible rectangular waveguide.

4. The waveguide assembly of claim 3 in which said collar member includes a shoulder section extending away from said flange member and in which the end of said jacket is positioned around the outside of said shoulder section and which further includes clamping means for effecting a pressure tight seal between said jacket and shoulder section and means for effecting a pressure tight seal between said collar member and said flange member.

5. The method of making a waveguide connector assembly, comprising the steps of providing a section of rectangular waveguide having predetermined internal and external dimensions, providing a connector member including a rectangular opening surrounded by a shoulder having a male clamping surface thereon which makes a predetermined acute angle with the axis of said rectangular opening, providing a collar member including a second rectangular opening having dimensions larger than the external dimensions of said waveguide which is surrounded by a female clamping surface which makes said predetermined acute angle with the axis of said second rectangular opening, sliding said collar member over said rectangular waveguide, flaring the end of said rectangular waveguide by cutting the corners for a predetermined distance and folding the side walls back to said predetermined angle with respect to the axis of said waveguide, placing the flared ends of said waveguide between said male and female clamping surfaces, and securing said collar member to said connecting member, whereby the flared ends of said rectangular waveguide are tightly held between said male and female clamping surfaces and said connector member is secured to said waveguide.

6. The method of claim 5 in which a section of flexible rectangular waveguide is provided.

7. The method of claim 6 which further includes the steps of providing a section of flexible tubular jacket material and sliding said jacket material over said waveguide prior to sliding said collar member over said waveguide.

8. The method of claim 7 which further includes the steps of making a pressure tight seal between said jacket material and said shoulder member and between said shoulder member and said flange member.

References Cited

UNITED STATES PATENTS

| | | | |
|---|---|---|---|
| 1,839,909 | 1/1932 | Weatherhead | 285—334.5 |
| 1,885,042 | 10/1932 | Baldwin | 285—334.5 |
| 2,542,877 | 2/1951 | Newcum | 285—334.5 |

FOREIGN PATENTS 1,213,873  4/1960  France.

HERMAN KARL SAALBACH, *Primary Examiner.*

L. ALLAHUT, *Assistant Examiner.*